United States Patent [19]

Hegel et al.

[11] Patent Number: 4,637,907
[45] Date of Patent: Jan. 20, 1987

[54] LATEX DIP TOOLING AND METHOD FOR FORMING SAME

[75] Inventors: James D. Hegel, Torrance; Davin W. Johnson, Rancho Palos Verdes, both of Calif.

[73] Assignee: Mattel, Inc., Hawthorne, Calif.

[21] Appl. No.: 720,337

[22] Filed: Apr. 5, 1985

[51] Int. Cl.4 .................. B29C 67/22; B29C 39/10; C08J 9/34; C08J 9/22
[52] U.S. Cl. .................. 264/45.7; 264/46.6; 264/225; 264/DIG. 6; 264/DIG. 7; 425/269
[58] Field of Search ......... 264/45.7, DIG. 6, DIG. 7, 264/225, 46.6; 425/269

[56] References Cited

U.S. PATENT DOCUMENTS

| | | | |
|---|---|---|---|
| 3,373,237 | 3/1968 | Mihalk et al. | 264/316 |
| 3,405,026 | 10/1968 | Roberts . | |
| 3,541,194 | 11/1970 | Resnick | 264/DIG. 6 |
| 3,547,747 | 12/1970 | Roberts . | |
| 3,652,748 | 3/1972 | Roberts | 264/45.7 |
| 3,723,585 | 3/1973 | Nussbaum | 264/45 |
| 3,869,295 | 3/1975 | Bowles et al. | 264/DIG. 7 |
| 3,958,997 | 5/1976 | Greenberg . | |
| 3,989,220 | 11/1976 | Greenberg | 249/105 |
| 4,231,982 | 11/1980 | Jannson | 264/112 |
| 4,283,240 | 8/1981 | Speer | 156/98 |
| 4,299,790 | 11/1981 | Greenberg | 264/299 |
| 4,342,716 | 8/1982 | Fishbaugh et al. | 264/225 |
| 4,374,076 | 2/1983 | Stephan et al. | 264/19 |
| 4,388,263 | 6/1983 | Prunty | 264/257 |

OTHER PUBLICATIONS

*Webster's New Collegiate Dictionary,* Springfield, Mass., G. & C. Merriam Co., c1961, p. 842.

*Primary Examiner*—Philip Anderson
*Attorney, Agent, or Firm*—Ronald M. Goldman; Melvin A. Klein; John G. Mesaros

[57] ABSTRACT

A tool for use in a latex dip process for producing a latex skin in a given configuration, the tool being formed by producing an electro-formed female mold from a sculpture of the desired configuration, casting a vinyl skin from the electro-formed female mold, removing the vinyl skin to expose a hollow interior, and stuffing the vinyl skin with a composition of materials, having the characteristics of providing rigidity to the vinyl skin and approximately zero buoyancy in a latex bath.

15 Claims, 7 Drawing Figures

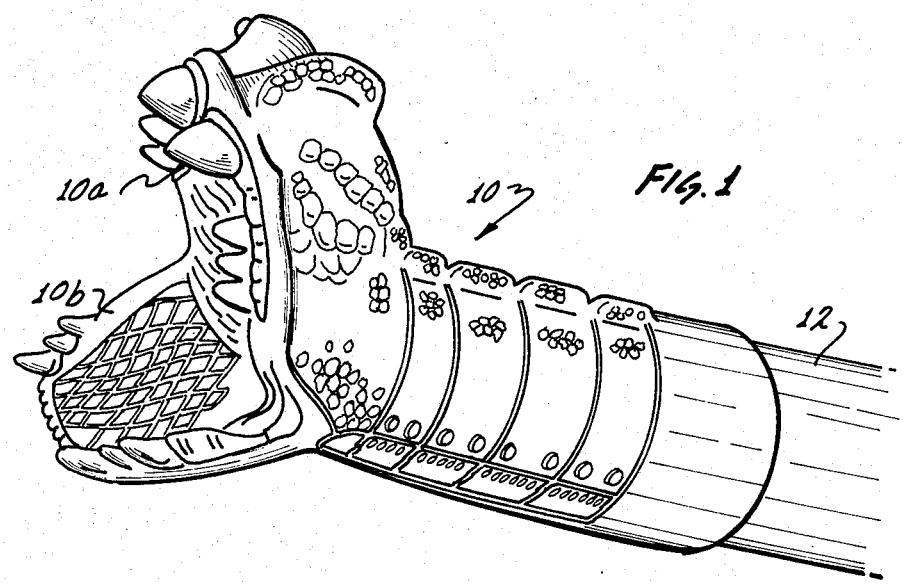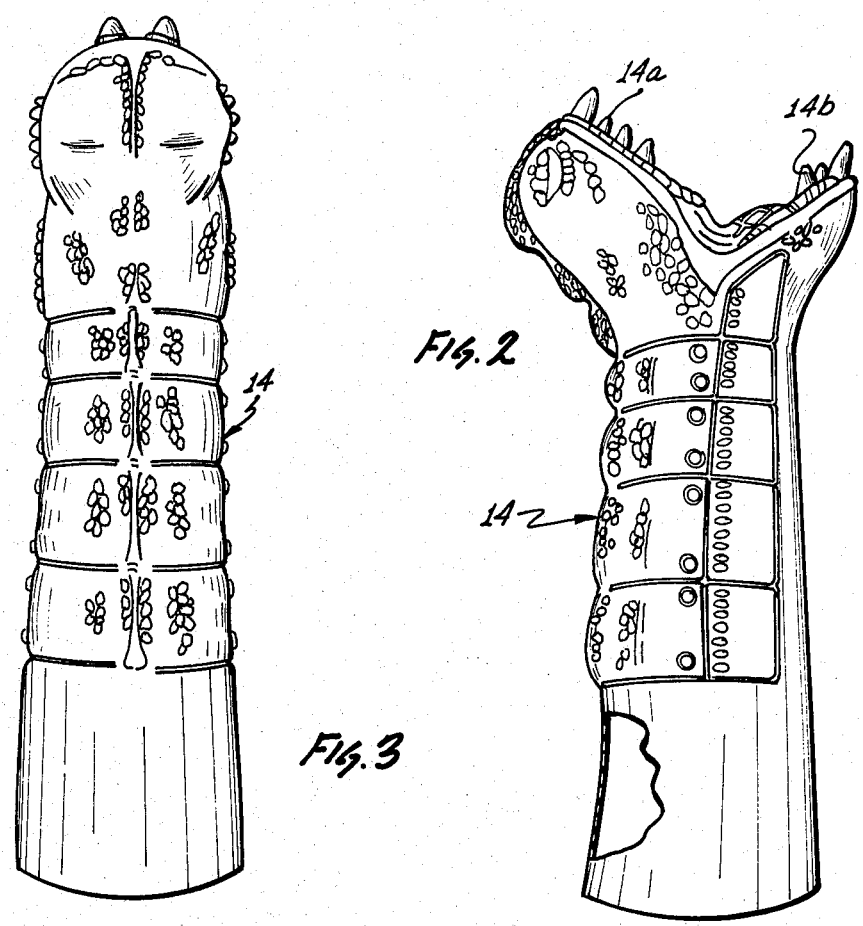

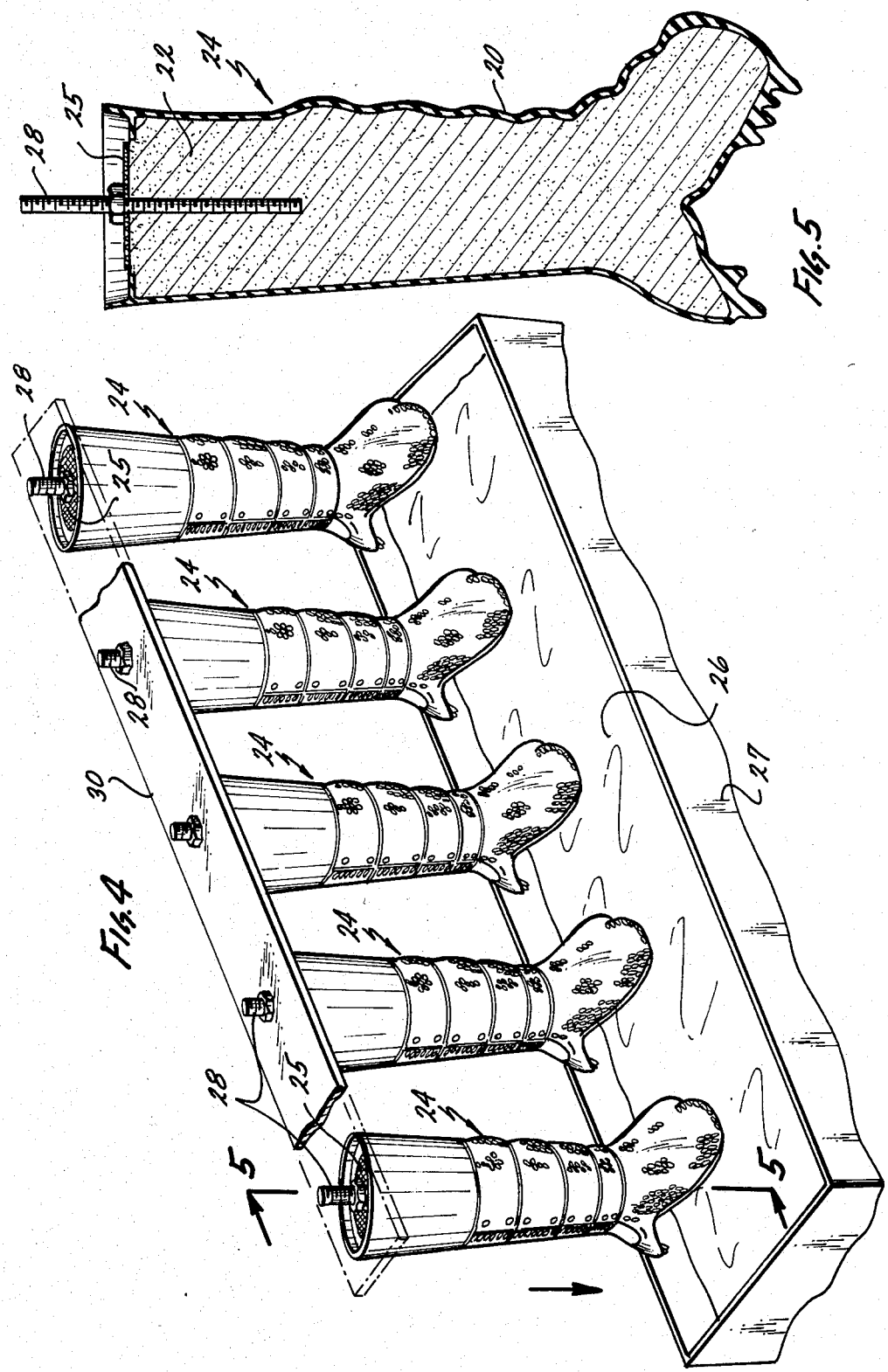

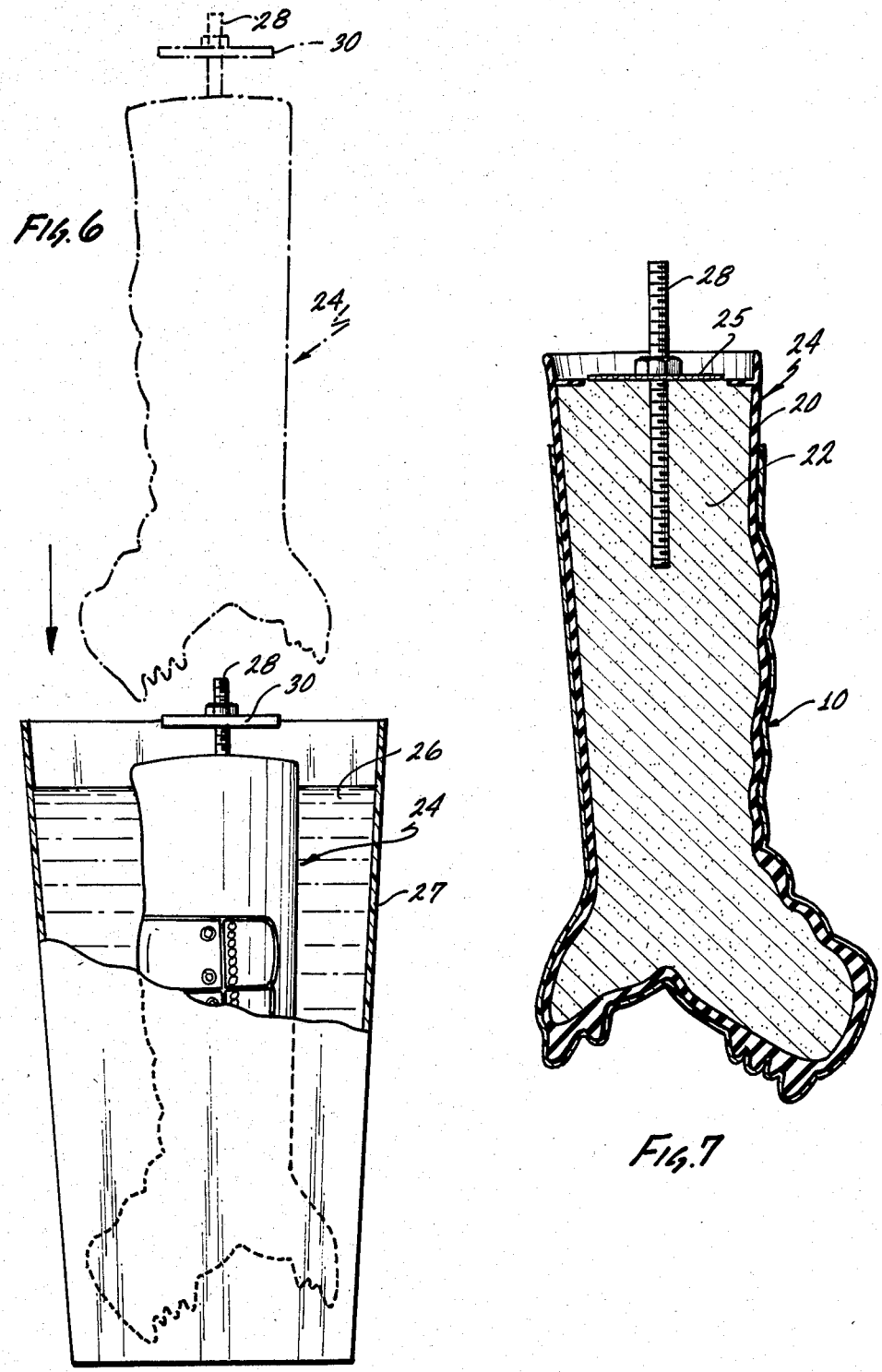

LATEX DIP TOOLING AND METHOD FOR FORMING SAME

BACKGROUND OF THE INVENTION

The background of the invention will be discussed in two parts:

1. Field of the Invention

This invention relates to tooling for complex non-geometric figures, and more particularly to tooling for use in a latex dip process, and the method for constructing such tooling.

2. Description of the Prior Art

In the use of latex dipping as a method for constructing an article, tooling is required, the tooling being in the form of a mold of the article to be produced. Heretofore, traditional tooling for latex dipping has been fabricated of metal. For simple geometric configurations, such tooling had been satisfactory. However, for complex non-geometrical configurations, the only practical methods for constructing such tooling are by the use of investment casting, which is very expensive, and by the use of permanent mold die casting which is very expensive for any volume of production.

Prior art relating to molding and tooling are exemplified in the following prior art patents. U.S. Pat. No. 3,373,237 relates to a "Method of Forming Delustered Shaped Articles of Synthetic Resins" issued to Mihalik, et al on Mar. 12, 1968, the method using an easily releasible sheet comprising a non-fibrous cellulosic sheet impregnated with finely divided rubber particles.

U.S. Pat. No. 3,405,026, directed to "Impact Resistant Article and Method of Manufacture", issued to Roberts on Oct. 8, 1968, the articles being three-dimensional, hollow and rigid and comprised of two essential elements: (1) a pliable outer premolded plastic skin and (2) a rigid plastic structural backing member solidified behind the skin and forming a joint cavity with the latter.

U.S. Pat. No. 3,547,747, issued Dec. 15, 1970 to Roberts for "Molded Plastics Article with Interiors Solidly Filled and Method for Their Manufacture" is a continuation in part of the preceding patent.

A "Method of Electroformed Molds" is shown and described in U.S. Pat. No. 3,723,585, issued to Nussbaum on Mar. 27, 1973, such patent disclosing a pattern having portions of the shape of the article on each side of a rectangular parting frame having parallel faces around its periphery.

A "Method of Shaker Molding and Composition Therefor" is shown and described in U.S. Pat. No. 3,958,997, issued to Greenberg on May 25, 1976, the method including the use of a mixture of water and a molding powder which are shaken together in an assembly to form a smooth mixture, which sets to form a jelly-like object which dries to form a rigid object.

U.S. Pat. No. 3,989,220, issued Nov. 2, 1976 to Greenberg for a "Shaker Molding Assembly", the patent disclosing an assembly which includes two mold halves which are urged together as they are pushed into a holder, with ribs on the mold halves cooperating with a frusto-conic wall of the holder to urge the mold halves together.

U.S. Pat. No. 4,231,982, issued Nov. 4, 1980, entitled "Method for the Production of Tools for Deep Drawing, Moulding, Extruding and the Like" discloses a method which comprises thermally spraying the wearing surface of the tool to be produced onto a negative replica of the tool to be produced.

A "Method for Repairing Grained or Embossed Vinyl Sheeting With Imprinted Vinyl Molds" is shown in U.S. Pat. No. 4,283,240, issued Aug. 11, 1981 to Speer, whereby the repaired area is grained or embossed in the original pattern without application of pressure, thereby eliminating depression or deformation in the repaired vinyl sheeting.

U.S. Pat. No. 4,299,790, issued to Greenberg on Nov. 10, 1981 discloses a "Method and Composition for Forming a Plaster Object".

U.S. Pat. No. 4,342,716, issued Aug. 3, 1982 to Fishbaugh, et al, for "Method and Apparatus for Molding Indicia in Roto-Molded Plastic Containers", wherein a message can be molded directly onto the surface of a plastic container.

A "Method for Making Cast Epoxy Resin Bodies and Epoxy Formulation Therefor" is shown in U.S. Pat. No. 4,374,076, issued Feb. 15, 1983 to Stephan, et al.

U.S. Pat. No. 4,388,263, issued June 14, 1983, to Prunty, for "Controlled Elastomeric Tooling for Plastic Fabrication", and discloses a fiber reinforced thermosetting resin composite material which is placed in contact with a fixed mold surface, with a reaction block placed on the opposite side of the composite and a controlled elastomeric tool is brought into engagement with the back of the reaction block.

It is an object of the present invention to provide a new and improved tooling for a latex dip process.

It is another object of the present invention to provide a new and improved method for forming tooling for latex dipping applications.

It is a further object of the present invention to provide a new and improved low cost latex dip tooling.

SUMMARY OF THE INVENTION

The foregoing and other objects are accomplished by constructing a low cost latex dip tooling by providing an electro-formed female mold of the article to be reproduced, casting a vinyl skin from the electro-formed female mold, and removing the skin to expose a hollow interior, and then stuffing the vinyl skin with a composition of materials having the characteristics of providing rigidity to the skin and approximately zero buoyancy in a latex bath.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 is a perspective view of a complex nongeometric article to be reproduced in accordance with the tooling of the present invention;

FIG. 2 is a side elevational view of a solid sculpture of the article of FIG. 1;

FIG. 3 is a top plan view of the sculpture of the article of FIG. 1;

FIG. 4 is a perspective view of a plurality of likenesses of the tooling formed in accordance with the invention prior to insertion into a latex bath to produce the article of FIG. 1;

FIG. 5 is a cross-sectional view of one of the tooling of FIG. 4 as viewed generally along line 5—5 thereof;

FIG. 6 is a side elevational view of the assembly of FIG. 4, with a dotted line depiction of the dip molded article elevated from the latex bath; and FIG. 7 is a cross-sectional view of the tooling of FIG. 5 with an article of FIG. 1 formed thereon.

DESCRIPTION OF THE PREFERRED EMBODIMENT

Referring now to the drawings, and particularly to FIG. 1, there is shown an article 10, which is in the form of a puppet in a sock-like configuration into which is inserted a hand and an arm 12 of the user. The puppet 10 is in the form of a mythical monster or serpent with the jaws 10a and 10b thereof operated by the hands of the user inserted therein. Such puppets 10 are usually formed from or with a thin outer sheath of elastic material, such as latex, and preferably of generally uniform thickness. However, in known methods of forming latex puppets, it is difficult or impossible to obtain the required uniform thickness. The present invention, among other things, overcomes these known difficulties.

As can be seen in FIG. 1, the article or puppet 10, is a non-geometric shape of complex configuration. In accordance with the present invention, referring to FIGS. 2 and 3, a sculpture 14 is first formed of the article 10. The sculpture 14 is formed of any convenient material, such as plaster of paris, or molding clay. From this sculpture 14, a female mold is made using electro-forming. In electro-forming, the sculpture has a layer of nickel and then a layer of copper electro-formed on the surface of the sculpture 14 to form a metallic envelope, which is then used as a female mold.

This female mold is then used to create cast vinyl skins, such as by roto-casting, or slush molding techniques. In roto-casting, a powdered thermoforming resin is placed into the hollow female mold of the article 10, the mold is then heated up to temperatures which may reach 700 degrees F, with the mold being simulataneously rotated about two axes while it is being heated. This distributes the powdered resin over the interior surface of the mold and fuses the resin into a seamless homogeneous structure with a generally uniform thickness, to create the vinyl skin 20 shown in FIG. 5.

In slush molding an excess solution of the material from which the vinyl skin 20 is to be formed is poured into the female mold. As the material reaches gelation temperature, the layer adjacent to the metal wall of the mold solidifies, with the thickness of the wall of the skin 20 being determined by the duration of the time the mold is exposed to the temperature of gelation. The excess solution is then poured off and heating is continued to complete the fusion after which the vinyl skin is then removed or stripped from the mold.

With either method of casting, the material selected for the vinyl skin 20 must have temperature resistance to the latex curing temperatures from which the article 10 is to be formed. As shown in FIG. 5, the interior of the vinyl skin 20 is stuffed with a suitable rigidifying filler 22 to form the latex dip tool, generally designated 24. The filler 22 is preferably a light, rigid, temperature-resistant material, which in conjunction with the skin 20, produce tooling having a neutral buoyancy in the heated liquid latex bath 26 within vat 27 (see FIGS. 4 and 6), that is, the density of the finished tool 24 should closely approximate the density of the liquid latex in the latex bath 26. Materials for the filler 22, which have been found to be low-cost are gypsum and plaster of Paris. However, they are too heavy when used alone. Therefore, a low-cost very low density material, such as expanded, cellular polystyrene beads is added, such as Syrofoam beads. Other filler materials are rigid urethane foamed in situ with scrap metal ballast; or epoxy casting compounds filled with glass balls, although these latter two tend to be more expensive.

The skin 20 is preferably filled with filler 22, as follows: the skin 20 is first filled with Styrofoam beads (or another ballast/filler); a wire screen 25 or other restraining means is placed over the beads to hold them in place; and the liquid plaster (or other filler material)is poured into the skin through the screen to fill the skin 20. A centrally extending vertical bolt member 28 is positioned within the center of the screen 25 and extends into the filler material and upon cure thereof, the bolt 26 is utilized to secure a number of equally spaced tools 24 (five being shown) to a beam member 30 (See FIG. 4).

As shown in FIG. 6, the tool 24 is substantially immersed in the latex bath 26 for a predetermined period of time, and thereafter removed for air or other drying. As shown in FIG. 7, the article 10 is formed as a generally uniform layer of latex material surrounding the immersed portion of the tool 24, which layer is then removed such as by stripping or peeling from the mold to provide the article 10 of FIG. 1.

In the production of such tooling, the use of low-cost techniques in the intermediate operations, such as electro-forming, roto-casting or slush molding, along with low cost materials for the tool 24, itself, enable the production of a tool 24 of low cost for a complex figure, compared to the prior art molds formed by investment casting or permanent mold die casting. Large volumes of tooling or tools 24 may be readily produced in accordance with the present invention, with all of the necessary physical and 10 chemical properties for use in a latex dip process.

While there has been shown and described a preferred embodiment, it is to be understood that various other adaptations and modifications may be made within the spirit and scope of the invention.

We claim:

1. The method of forming a tool for use in a latex dip process for producing a latex skin in a given configuration, including the steps of:
    producing an electro-formed female mold from a sculpture of the desired configuration;
    casting a vinyl skin from said electro-formed female mold and removing said skin to expose a hollow interior; and
    stuffing the vinyl skin with first and second materials, said first material being a ballast material, and said second material including one of glass balls and expanded, cellular beads, said first and second materials being selected in proportion for providing rigidity to said vinyl skin and approximately zero buoyancy for said tool in a latex bath.

2. The method of claim 1 wherein said first material is plaster of paris, and said second material is beads of expanded, cellular polystyrene therein.

3. The method of claim 1 wherein the step of stuffing the vinyl skin includes stuffing the vinyl skin with a first material of epoxy casting compound filled with a second material of glass balls.

4. The method of claim 1 wherein the step of stuffing the vinyl skin includes stuffing the vinyl skin with a second material of a composition of urethane material foamed therein along with a first material of a ballast material in proportion to provide approximately zero buoyancy in a latex bath.

5. The method according to claim 4 wherein said urethane material is foamed in situ with said ballast material including scrap metal.

6. The method according to claim 1 wherein the step of casting a vinyl skin includes roto-casting of the vinyl skin from said female mold.

7. The method according to claim 1 wherein the step of casting a vinyl skin includes slush molding of the vinyl skin from said female mold.

8. A tool for use in a latex dip molding process to produce a complex latex skin configuration, said tool comprising:

an outer skin of a first material exposing an outer surface in the desired configuration, said skin defining an internal hollow, said first material having a composition sufficient to withstand the latex curing temperatures; and a generally rigid second material filling said hollow, said second material having a low density, with said first and second materials being selected and utilized in proportion for providing rigidity to said outer skin and approximately zero buoyancy for the tool in a latex bath.

9. The combination according to claim 8 wherein said first material is a vinyl composition.

10. The combination according to claim 9 wherein said second material includes plaster of paris and beads of expanded, cellular polystyrene.

11. The combination according to claim 9 wherein said second material is a urethane material foamed in situ with ballast material in proper proportion to provide approximately zero buoyancy for said tool in a latex bath.

12. The combination according to claim 11 wherein said ballast material is scrap metal.

13. The combination according to claim 9 wherein said second material is an epoxy casting compound filled with glass balls.

14. The combination according to claim 8 wherein said tool further includes means for enabling said tool to be attached to a dipping mechanism.

15. The combination according to claim 14 wherein said means for enabling attaching includes rod means extending into said hollow and held therein by said second material.

* * * * *